United States Patent [19]

Earls et al.

[11] Patent Number: 4,913,803
[45] Date of Patent: Apr. 3, 1990

[54] PARTICLE SEPARATION SYSTEM

[75] Inventors: Jerome E. Earls, Aptos; Dane T. Snyder, San Jose, both of Calif.

[73] Assignee: Radiological & Chemical Technology, Inc., San Jose, Calif.

[21] Appl. No.: 178,529

[22] Filed: Apr. 7, 1988

[51] Int. Cl.$^4$ .............................................. B03B 7/00
[52] U.S. Cl. ........................................ 209/17; 209/158; 209/159; 209/315; 209/380
[58] Field of Search ................ 209/2, 17, 158, 159, 209/315, 380

[56] References Cited

U.S. PATENT DOCUMENTS

| | | | |
|---|---|---|---|
| 1,441,870 | 1/1923 | Megraw | 209/380 X |
| 3,537,657 | 11/1970 | Henne et al. | 209/17 X |
| 3,550,773 | 12/1970 | Villani | 209/138 |
| 4,746,421 | 5/1988 | Turbitt | 209/3 |

FOREIGN PATENT DOCUMENTS 2050201  1/1981  United Kingdom ................. 209/17

Primary Examiner—Andres Kashnikow
Attorney, Agent, or Firm—Fliesler, Dubb, Meyer & Lovejoy

[57] ABSTRACT

A mixture of two sets of similarly sized particles having different terminal velocities in a separation liquid is separated. This is done by removing either the smaller particle portion of the set having the greater terminal velocity, or the larger particle portion of the set having the lesser terminal velocity, or both, for example, by sieving. The resulting mixture is introduced into a tube in which the separation liquid is flowing upwardly. This eliminates intermixing of the fines of one set with the larger particles of the other set. The flow of liquid in the tube can be arranged to provide laminar flow separated by two regions of turbulent flow to improve separation of particles. Anion and cation exchange resin particles can be separated in this manner, regenerated and returned to service.

23 Claims, 4 Drawing Sheets

PARTICLE SEPARATION SYSTEM

TECHNICAL FIELD

This invention relates to a method of cleaning, separating, and transferring intermixed cation and anion exchange resin beads of similar sizes. Beds of such intermixed beads are commonly used in the treatment of water to remove ionic impurities.

BACKGROUND ART

Ion exchange resins are utilized in the production of high purity water. These resins are materials which are able to remove ionic impurities from water by a mechanism of selective ion exchange on a large number of active sites contained in the matrix of the resin. This process continues until such time as the active sites have been saturated with the ionic impurities. Commonly, at that time, the ion exchange resins are regenerated with highly concentrated ionic solutions (i.e., sulfuric acid, sodium hydroxide, sodium chloride, etc.,) to restore their capacity to remove the ionic impurities from high purity water. The highest purity water can be produced by utilizing a mixed bed of ion exchange resin beads. This is a combination of anion and cation exchange resin beads intimately intermixed.

Regeneration of anion resins in a high purity water treatment application is most commonly done with a strong caustic solution. Regeneration of cation resins in a high purity water treatment application is most commonly done with a strong acid solution.

To avoid improper regeneration of the cationic and anionic exchange sites, it is essential to separate the anion resins from the cation resins prior to the chemical regenerations. The most commonly practiced technique for separating anion and cation exchange resins is to fluidize, with water, the mixed resin bed in a cylindrical vessel to achieve a predetermined bed volume expansion. The anion resins, by virtue of their lower density, are preferentially transported to the upper regions of the cylindrical vessel. An additional result of this fluidization is to remove a portion of the insoluble impurities which may have been collected on the ion exchange bed while in service.

Once bed expansion has been effected, fluidization is discontinued and the expanded resin bed is allowed to settle. An interface normally forms between the anion and cation resin masses. Typically, the anion portion is drawn out of the separation vessel and transferred to a separate vessel where regeneration is performed. The remaining cation resins are subsequently regenerated in a separate vessel. Industrial experience with this method of separating, cleaning, and transferring resins has shown the process to result in considerable (1-5%) cross contamination of the anion and cation resins. That is, 1-5% of the cation resin beads end up in the anion regeneration vessel and vice versa. This results in 1-5% of the resin being regenerated into an improper ionic form for the production of high purity water. Additionally, in order to achieve adequate cleaning of the insoluble impurities from the resins, large volumes of water must be consumed (100-500 gallons per cubic foot of resin).

Efforts to overcome the resin cross contamination problem includes the following techniques: (1) Using a high concentration sodium hydroxide solution to "float" the anion resin beads away from the entrained cation resin beads; (2) Pretreating the separated anion resin beads with ammonium hydroxide to convert any entrained cation resin beads to the ammonia form (this practice is utilized in steam boiler designs that operate with ammoniated water to minimize system component corrosion); (3) Manufacturing ion exchange resins having a carefully controlled narrow resin bead size distribution which creates a large difference in terminal settling velocities between the anion and cation resins (this facilitates the hydraulic separability of the resins); (4) Including a small amount of inert resins (neither anionic or cationic) having a density intermediate that of the anion and cation resins in the resin mass (when conventional hydraulic separation is attempted, these inert resin beads form a thin layer between the anion and the cation resin masses. A specially designed fluidization vessel is utilized in this process. This vessel consists of a cylindrical top and a conical bottom. After initial fluidization, the cation resins are drawn off of the bottom of the conical section and passed by an inline conductivity monitor. This monitor is capable of measuring a conductivity difference between cation resin slurry, inert resin slurry, and anion resin slurry. Thus, when the end of the cation slurry phase is sensed by the conductivity monitor, flow is ceased and a resin separation has been effected).

All of the processes described above suffer from one or more of the following defects: (1) The resins are subjected to significant mechanical, thermal, and chemical stresses in the course of normal service, transfer, cleaning, and chemical regeneration. This results in some degree of physical breakdown of the resin beads. Thus, there is a continual degradation in the resin bead particle size distribution over a period of time. This brings about the production of quantities of fractured beads known in the trade as resin "fines". These fines create problems both in the operation of the ion exchange bed (i.e., increased differential pressure across the bed) and in the hydraulic separation of the mixed beads prior to regeneration. Unfortunately, a cation resin bead fragment can appear identical to a whole anion resin bead in terms of their hydraulic settling. Therefore, inadequate separation of the anion and cation resins can result. (2) The cleaning and separation of resins commonly depends upon the use of air and water to loosen and remove insoluble impurities from the ion exchange resins. Poor water flow distribution in the cylindrical vessels normally used for these processes results in pockets of little or no hydraulic activity. Thus, there are regions from which the insoluble impurities are not removed. To compensate for this inadequacy, the cleaning operation most often evolves into a multiple step process which consumes large volumes of water and requires a considerable amount of time. (3) As described above, poor water/resin contact can result in poor removal of insoluble impurities from the resins. This creates problems during the regeneration and subsequent rinsing of the resins. Clean resins are more receptive to both the chemical regenerants and water rinses than are dirty resins. (4) In many conventional resin transfer systems, the resin ratio and total volume of mixed resins must be carefully controlled in order to achieve any degree of separation. This is because a resin interface must be formed at precisely the correct height in the separation vessel in order to draw the anion resin beads away from the cation resin beads through the fixed point transfer piping. If this resin ratio is varied or the total resin volume is incorrect, severe cross contamination of the resins results. (5) In an effort to overcome some of the limitations inherent in some of the resin separation equipment, complex multiple step, multiple transfer processes have been developed by dedicated operators. While significant improvement is observed in some cases, the processes are extremely complicated and require a great deal of intuitive response on the part of the operator.

The present invention is directed to overcoming one or more of the problems as set forth above.

DISCLOSURE OF THE INVENTION

In accordance with an embodiment of the present invention a method is set forth for separating a mixture of a first and a second set of particles, each set having particle size distributions generally centered about an average particle size section and having generally decreasing amounts of smaller and larger particles to define respective first and second particle size distributions each having a smaller particle size section, said average particle size section and a larger particle size section, with the particle sizes of the smaller particle size sections overlapping one another and with the particle sizes of the larger particle size sections overlapping one another, the first set of particles having a higher average terminal velocity when placed in a separation liquid then does the second set. Either at least a smaller particle size portion and any finer extraneous particles of said first set or at least a larger particle size portion and any larger extraneous particles of said second set is separated from the mixture. This results in the formation of a resulting mixture with either a first set substantially free of its smaller particle size portion and also substantially free of its finer extraneous material or a second set substantially free of its larger particle size portion and also substantially free of its larger extraneous material. The first and second sets of the resulting mixture are composed of particles having substantially completely non-overlapping terminal velocities in the separation liquid. The resulting mixture is introduced at an entry height into a generally vertically extending tube having the separation liquid flowing upwardly therethrough at a velocity less than the terminal velocities of the particles of the first set and greater than the terminal velocities of the particles of the second set whereby the first set falls downwardly in the tube to a lower region substantially free of the second set and the second set is carried upwardly in the tube to an upper region substantially free of the first set, the upper region being above the entry height. The particles of the first set are removed from the lower region and the particles of the second set are removed from the upper region.

In accordance with another embodiment of the present invention a method is set forth of regenerating a mixture as set forth above. Either at least a smaller particle size portion and any finer extraneous particles of said first set or at least a larger particle size portion and any larger extraneous particles of said second set is separated from the mixture to form a resulting mixture with either a first set substantially free of its smaller particle size portions and substantially free of its finer extraneous material or a second set substantially free of its larger particle size portion and also substantially free of its larger extraneous material. The resulting mixture of first and second sets are composed of particles with substantially completely non-overlapping terminal velocities in the separation liquid. The resulting mixture is introduced at an entry height into a generally vertically extending tube having the separation liquid flowing upwardly therethrough at a velocity less than the terminal velocities of the particles of the first set and greater than the terminal velocities of the particles of the second set whereby the first set falls downwardly in the tube to a lower region substantially free of the second set and the second set is carried upwardly in the tube to an upper region substantially free of the first set, the upper region being above the entry height. The particles of the first set are removed from the lower region. The particles of the second set are removed from the upper region. The particles of the first set and of the second set are seperately regenerated.

In accordance with still another embodiment of the present invention an apparatus is set forth for separating a mixture as set forth above. The apparatus includes means for separating from the mixture either at least a smaller particle size portion and any finer extraneous particles of the first set or at least a larger particle size portion and any larger extraneous particles of the second set to form a resulting mixture with either a first set substantially free of its smaller particle size portion and at least substantially free of its finer extraneous material or a second set substantially free of its larger particle size portion and substantially free of its larger extraneous material. A generally vertically extending tube has an entry at an entry port height. A separation liquid flows upwardly through the tube at a velocity less than the terminal velocity of the particles of the first set of particles and greater than the terminal velocity of the particles of the second set of particles. Means is provided for introducing the resulting mixture at the entry port height into the tube wherein the first set of particles falls downwardly in the tube to a lower region substantially free of the second set and the second set is carried upwardly above the entry port height in the tube to an upper region substantially free of the first set. Means is provided for removing the particles of the first set from the lower region and means is provided for removing the particles of the second set from the upper region.

In accordance with another embodiment yet of the present invention an apparatus is set forth for regenerating a mixture as set forth above. The apparatus includes means for separating from the mixture either at least a smaller particle size portion and any finer extraneous particles of the first set or at least a larger particle size portion and any larger extraneous particles of the second set to form a resulting mixture with either a first set substantially free of at least its smaller particle size portions and at least substantially free of its finer extraneous material or a second set substantially free of its larger particle size portion and also substantially free of its larger extraneous material. A generally vertically extending tube has an entry at an entry port height. A separation liquid flows upwardly through the tube at a velocity less than the terminal velocity of the particles of the first set of particles and greater than the terminal velocity of the particles of the second set of particles. Means is provided for introducing the resulting mixture at the entry port height into the tube wherein the first set of particles falls downwardly in the tube to a lower region substantially free of the second set and the second set is carried upwardly above the entry height in the tube to an upper region substantially free of the first set. Means is provided for removing the particles of the first set from the lower region and means is provided for removing the particles of the second set from the upper region. Means is provided for regenerating the particles of the first set and means is provided for regenerating the particles of the second set.

Operation in accordance with the present invention overcomes all of the previously mentioned problems of the prior art. There is a continuous upgrade of resin particle size distribution and the process can be used with any resin volume. Insoluble impurities are removed. Furthermore, continuous processing is provided in accordance with the present invention. And, the present invention can be utilized with any ratio of the particles to be separated, for example, any ratio of anion exchange resin beads to cation exchange resin beads. Still further, the structure of the apparatus of the invention is such that separation therein is particularly clean. And, water usage is minimal, being limited to incidental loss.

BRIEF DESCRIPTION OF DRAWINGS

The invention will be better understood by reference to the figures of the drawings wherein like numbers denote like parts throughout and wherein.

BEST MODE FOR CARRYING OUT INVENTION

Figure 1:
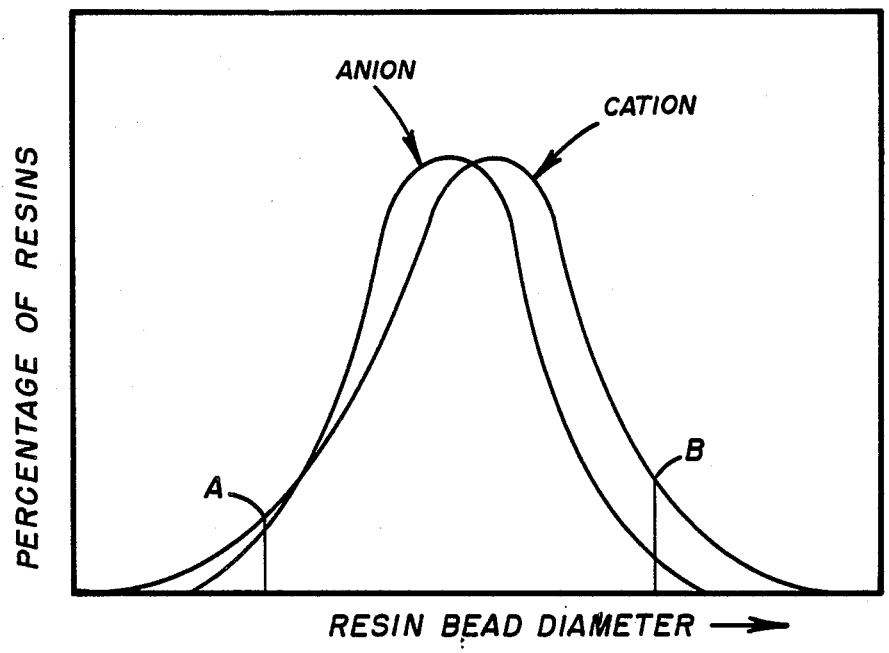
FIG. 1 illustrates, graphically, the size distribution of two sets of nearly equal sized intermixed particles.
Figure 2:
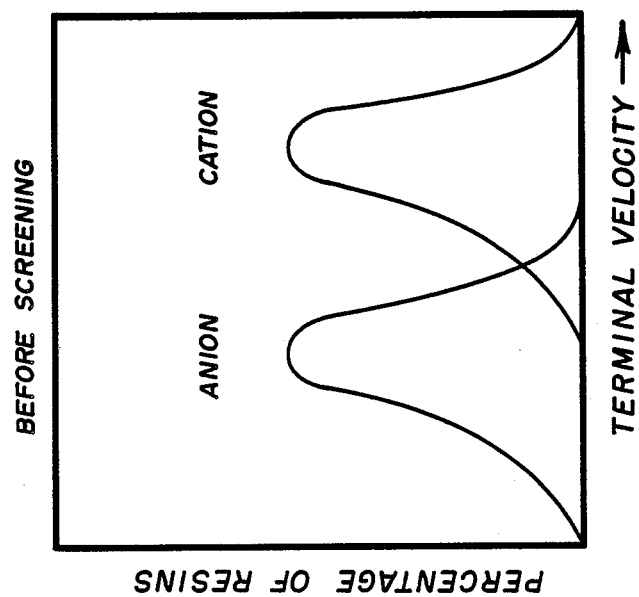
FIG. 2 illustrates, graphically, the terminal velocities of the two sets of intermixed particles of FIG. 1 and having different but overlapping terminal velocity distributions with each set including both finer and larger particles.

The present invention is directed to the separation of two sets of intermixed particles (illustrated as cation and anion exchange resin particles for convenience, the invention not, however, being so limited) with the particles of each set being of approximately the same size. In particular, the present invention is needed when the particle size distribution of each set of particles overlaps as seen in FIG. 1 in the tailing portions of the size distribution curves and wherein the terminal velocity distributions of the two sets overlap as seen in FIG. 2. The present invention operates by removing either at least the smaller particles of the higher average terminal velocity set oat least the larger particles of the lower average terminal velosity set. Most conveniently, the invention can operate by removing either or both of the smaller particles of each set and the larger particles of each set, generally in the regions to the left of the line indicated by the letter A and to the right of the line indicated by the letter B in FIG. 1. Smaller and large insoluble extraneous materials, for example, materials which have flaked off of vessels or conduits, are also removed.

The particles can be separated due to their having two different average terminal velocities. The term terminal velocities as used herein is defined by the equation $$V_t = \left( \frac{4gd(\rho_s - \rho_1)}{3\rho_1 C} \right)^{\frac{1}{2}}$$

where:
 $V_t$ = terminal velocity,
 $\rho_s$ = particle density,
 $\rho_1$ = liquid density,
 d = size of particle (diameter for spherical particles),
 C = drag coefficient, and
 g = acceleration due to gravity.

Figure 3:
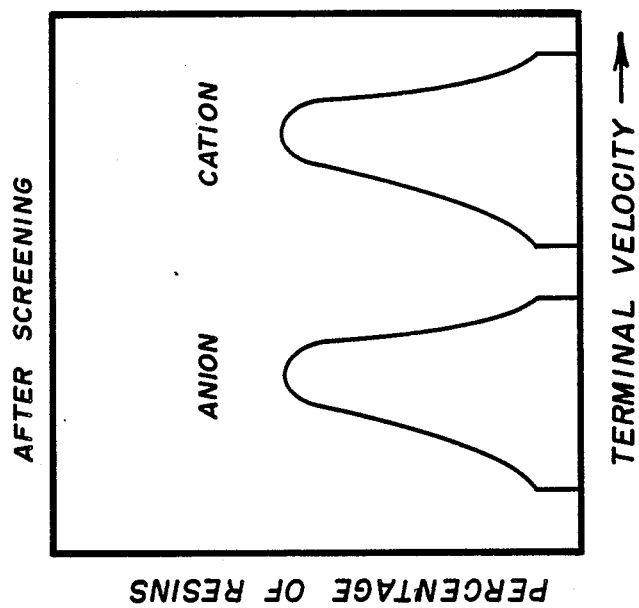
FIG. 3 illustrates, graphically, the terminal velocities of the two sets of particles of FIG. 1 having different terminal velocities with the finer and larger particles of each set having been removed.

FIG. 2 illustrates the terminal velocity distributions in a separation liquid, often water or a water based solution, of each of the two sets shown in FIG. 1, but without the fines and larger particles having been removed. FIG. 3 shows the terminal velocity distribution of the modified sets produced by removing the fines and larger particles at the postions A and B in FIG. 1. Note that there is no overlap in terminal velocities of the modified sets whereby a clean separation can be obtained. Note also, that to avoid overlap it is only necessary that either the smaller particle size portion of the higher terminal velocity set (as illustrated the cation exchange resin particles) or, alternatively, the large particle size portion of the lower terminal velocity set (as illustrated the anion exchange resin particles) need be removed. In practice, as explained below, it is easiest to remove the smaller particle size portions of each set, or the larger size portions of each set, or both, generally via a screening operation.

The chemical composition of the particles is unimportant as the separation is based upon physical, rather than chemical differences. Suitably the particles are at least somewhat rounded and preferably they are roughly (or precisely) spherical. However, particle shape, within reason, is not critical.

Figure 4:
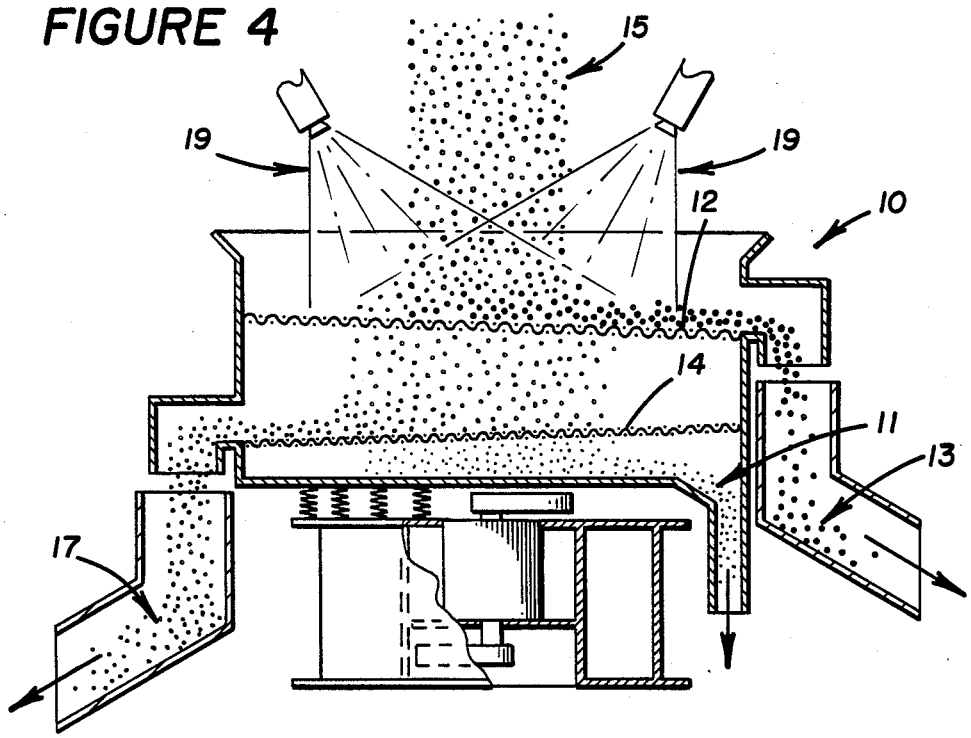
FIG. 4 illustrates, schematically, a seiving apparatus useful in accordance with an embodiment of the present invention.

FIG. 4 illustrates a vibrating screen apparatus 10 which can be utilized to remove the fines 11 and larger particles 13 from a mixture 15 of the aforementioned first and second set of particles. The mixture 15 of particles is delivered onto an upper very coarse first screen 12 whereby larger particles 13 are retained on the screen and the great majority of the mixture 15 passes the through the first screen 12.

The portion of the mixture 15 of particles which pass through the first screen 12 then falls upon a second screen 14 which allows the fine particles 11 to pass through but retains a modified mixture 17 of the particles in the desired size range. Basically, the first screen 12 makes the separation shown at "B" of FIG. 1 and screen 14 makes the separation shown at "A" of FIG. 1. The screens are vibrated in a conventional manner, for example, whereby the oversize particles 13 are moved outwardly during the vibration and discarded as are the undersized particles 11 which pass through the fine second screen 14. For example, the screens can be at angles to the horizontal as illustrated. The modified mixture 17 of particles entrapped upon the fine second screen 14 and beneath the coarse first screen 12 now has the modified particle size distribution between "A" and "B" of FIG. 1.

Advantageously, a liquid spray 19 (often water or a water based solution) can be directed upon the modified mixture 17 of particles sitting upon the fine screen 14 during or following the sieving, for example through the screen 12, so as to wash off any adhering fines, e.g., corrosion products, which pass through the fine screen 14 and are discharged.

Figure 5:
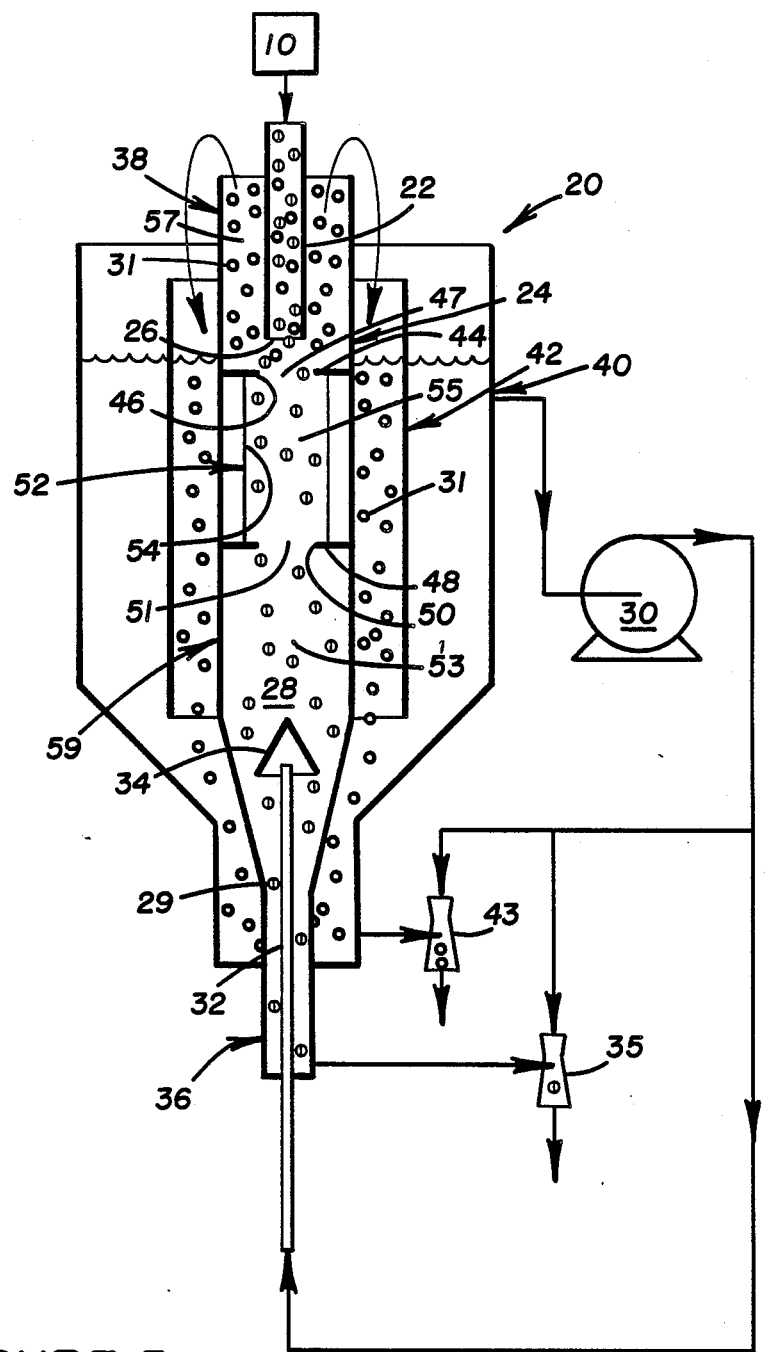
FIG. 5 illustrates, schematically, an apparatus in accordance with an embodiment of the present invention.

The resulting mixture 17 of the resulting first and second sets of particles then passes to an apparatus 20 (see FIG. 5) and, more particularly, enters via a small tube 22 which leads into a larger generally vertically extending concentric tube 24 at an entry port 26 which, in the embodiment illustrated, is merely the open bottom of the small tube 22. A separation liquid 28 fills the tube 24 and is flowing upwardly therethrough at an average velocity which is less than the terminal velocity of the particles 29 of the modified first set of particles but greater than the terminal velocity of the particles 31 of the modified second set of particles. Thus, the particles 29 of the modified first set of particles (the set having the higher terminal velocity, e.g., the cation exchange resin particles) are carried downwardly by gravity whereas the particles 31 of the modified second set of particles are carried upwardly along with the separation liquid 28.

An appropriate pump 30 can provide the impetus for the flow of the liquid 28. Generally, however, any source of pressurized fluid will suffice. The fluid flowing upwardly within the tube 24 is preferably introduced in a relatively smoothly flowing manner. This can be accomplished, for example, by having the separation liquid flow up a central pipe 32 and be discharged against the bottom of an appropriate, for example, a conical, deflector 34 whereby the water then passes downwardly and about the edges of the deflector 34 and then upwardly through the tube 24.

Figure 6:
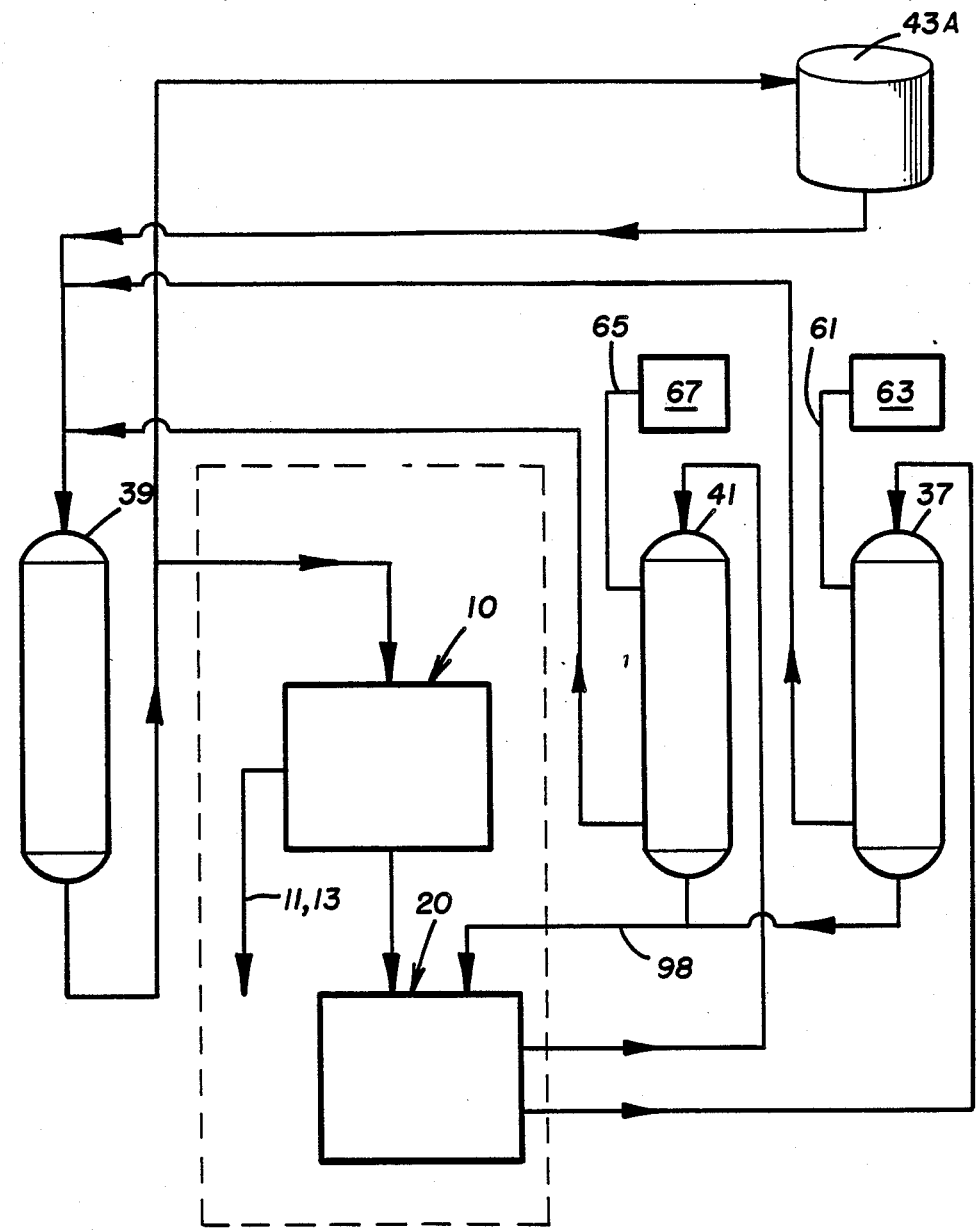
FIG. 6 illustrates, schematically, an apparatus in accordance with an embodiment of the present invention incorporated in an overall system.

The particles 29 of the modified first set of particles is removed from the bottom of the tube 24, in the embodiment illustrated from a smaller internal diameter lower region 36 of the tube 24. Note that the lower region 36 does not necessarily have a smaller internal diameter. The pump 30 can be used to provide pressure to transport the first set of particles (e.g., cation exchange resin beads), via an eductor 35, to a regeneration tank 37 (FIG. 6) wherein they are regenerated (e.g., by washing with sulfuric acid) and then on to a storage tank 39 where they are, generally, remixed with regenerated particles 31 of the second set of particles. Water recycling occurs via water recycle line 98 during the separation process. Line 61 serves for introducing a regenerating liquid to regeneration tank 37 from a regenerating liquid tank 63. Tank 43a represents a use tank in which ion exchange is carried out using regenerated particles 29 and 31 from storage tank 39. Spent particles from tank 43A are passed first to storage tank 39 and then to separation in vibrating screen apparatus 10.

Means is also provided for removing the particles 31 of the second set of particles from an upper region 38 of the tube 24, the upper region 38 being above the entry height (at entry 26) in the tube 24. In the particular embodiment illustrated the particles 31 of the second set of particles 31 (e.g., anion exchange resin beads) are swept upwardly by the separation liquid 28 within the tube 24 to the upper region 38 and then over the top of the tube 24, which in the embodiment illustrated is opened topped, and into a surrounding tube 40 wherein they flow downwardly under the influence of gravity and are tapped off and then pumped to a regeneration tank 41, for example, via an eductor 43, utilizing pressure from the pump 30. They are regenerated (e.g., by washing with sodium hydroxide) while in the regeneration tank 41. Line 65 serves for introducing a regenerating liquid to regeneration tank 41 from a regenerating liquid tank 67.

A baffle 42 can be present within the surrounding tube 40, if desired, in order to better direct the particles 31 of the second set of particles to a desired take off position and to prevent the particles 31 from entering the pump 30.

The above set forth method and apparatus can be used on a continuous basis with a mixture to be separated continuously introduced and continuously separated and the separated sets being regenerated.

It should be noted that within the tube 24 the average upward velocity of the separation liquid 28 must be such that it will lift the particles 31 of the second set of particles but will allow the particles 29 of the first set of particles to travel downwardly under the influence of gravity. Within this constraint, it has been found that it is desirable to divide the tube 24 into three areas of laminar flow and two areas of turbulent flow. The two areas of turbulent flow are provided, in the embodiment illustrated, by the inclusion of an upper flange 44 which extends peripherially inwardly from the tube 24 to form an upper restricted opening 46 which defines an upper area 47 of turbulent flow. A lower flange 48 extends inwardly peripherially inwardly from the tube 24 to form a lower restricted opening 50 which defines a lower area 51 of turbulent flow.

Intermediate to the flange 44 and to the flange 48, a middle tubular member 52 is preferably present to define a central flow passage 54 wherein relatively swift laminar flow occurs with the passage 54 defining a middle area 55 of laminar flow between the upper region 38 which constitutes an upper area 57 of laminar flow and a lower generally unrestricted region 59 which constitutes a lower area 53 of laminar flow.

In the laminar flow areas 55,57,53, the flow has a Reynolds No. in the range of 3,000–5,000. In the turbulent flow regions the Reynolds No. is above 6,000. If the upward velocity in the upper area 57 of the tube 24 is assigned the value of unity (for comparison), then the value in the middle area 55 is greater than unity, for example between 1.1 and 1.8, and the velocities in the turbulent flow areas 47,51 are, for example, 1.8 to 3.5, more usually 2.2 to 2.8.

In the upper turbulent area 47 a mixture of the particles 29 from the modified first set and of the particles 31 from the modified second set contact the turbulent flow. The particles 31 from the second set are generally all thrown upwardly. Indeed, many of the particles 29 from the first set are also thrown upwardly and only those which meet a local upward velocity of less than their terminal velocity proceed downwardly. Thus, the upper turbulent area 47 is such as to block out substantially all downward flow of the second set of particles 31. The second or lower turbulent area 51 repeats this procedure and, further, since the middle area 55 has a larger upward velocity than elsewhere in the separation portion of the tube 24 other than in the turbulent areas 47 and 51, particularly swiftly impels any few particles 31 of the second set of particles which may have passed through the upper turbulent area 47 back upwardly and again into the upper turbulent area 47 and therefrom upwardly again into the upper region 38 of the tube 24. Thus, highly improved separation of the first set of particles from the second set of particles results. Note that the use of the two turbulent flow areas essentially eliminates any problems that might occur because of wall effects whereby the separation liquid 28 near the walls of the tube 24 would be moving upwardly at a much smaller velocity than the separation liquid 28 moves upwardly at the center of the tube 24, thus potentially allowing some of the particles of the second set of particles to flow downwardly adjacent the inside wall of the tube 24 where they would encounter local velocities that were less than their terminal velocity.

As mentioned above, the invention is particularly concerned with the separation of particles of intermixed anion and cation exchange resins. Generally such particles are of about the same size and the difference in their average terminal velocity, while real, is not particularly great. Note that the particles will often be spherical or nearly spherical in shape but that such is not required for operation in accordance with the present invention. For true accuracy of the terminal velocity equation set up above, such is required, but the equation can be used as a close approximation in those cases where compact non-spherical particles are present.

Industrial Applicability

The present invention provides a method of separating two intermixed sets of similarly sized particles 29,31 which have differing terminal velocities in a separation liquid 28. For example, the invention provides separation of cation exchange resin beads from anion exchange resin beads whereby each can be separately regenerated and returned to use as a mixed bed. The resin bead size distribution is controlled and can be controlled on a continuous bases. The resin slurry being transferred from its use condition to treatment in accordance with the present invention can be dewatered relatively easily whereby the hydraulics of separation of the resin particles is not affected. Corrosion products and other extraneous large and small particles may be readily removed. The two sets of resin particles 29,31 need not be present in equal quantities. Furthermore, the separation liquid 28, generally water, is recycled whereby the process does not consume any water or contribute any water to waste other than due to evaporation and spillage.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:

1. A method for separating a mixture of a first and a second set of particles, each set having a particle size distribution generally centered about an average particle size section and having generally decreasing amounts of smaller and larger particles to define respective first and second particle size distributions each having a smaller particle size section, said average particle size section and a larger particle size section with the particle sizes of the smaller particle size sections overlapping one another and with the particle sizes of the larger particle size sections overlapping one another, the first set of particles having a higher average terminal velocity when placed in a separation liquid than the does the second set, comprising:

separating from said mixture either at least a smaller particle size portion and any finer extraneous particles of said first set or at least a larger particle size portion and any larger extraneous particles of said second set in such a manner as to form a resulting mixture with either said first set substantially free of at least said smaller size particle portion thereof and of finer extraneous material or said second set substantially free of at least said larger size particle portion thereof and of larger extraneous material, said separating being such that the first and second sets of the resulting mixture are composed of particles having substantially completely non-overlapping terminal velocities in said separation liquid;

introducing said resulting mixture at an entry height into a generally vertically extending tube having said separation liquid flowing upwardly therethrough at a velocity less than the terminal velocities of the particles of said first set and greater than the terminal velocities of the particles of said second set whereby said first set falls downwardly in said tube to a lower region substantially free of particles of said second set and said second set is carried upwardly in said tube to an upper region substantially free of particles of said first set, said upper region being above said entry height;

removing the particles of said first set from said lower region; and removing the particles of said second set from said upper region.

2. A method as set forth in claim 1, wherein said method is carried out continuously with said mixture being continuously separated to form said resulting mixture which is continuously introduced to said tube and with said particles of said first and second sets being continuously removed from said lower and upper regions of said tube.

3. A method as set forth in claim 1, wherein one of said sets is composed of cation exchange resin particles and the other of said sets is composed of anion exchange resin particles.

4. A method as set forth in claim 3, wherein said separating step comprises sieving.

5. A method as set forth in claim 1, wherein said separating removes the smaller particle size portion and any finer extraneous material and the larger particle size portion and any larger extraneous material of both sets.

6. A method as set forth in claim 1, wherein said separating removes from the mixture either the smaller particle size portions and any extraneous smaller material of both sets or the larger particle size portion and any larger extraneous material of both sets.

7. A method as set forth in claim 1, wherein said separating step comprises sieving.

8. A method as set forth in claim 7, further including, rinsing said modified first and second sets following said sieving.

9. A method as set forth in claim 8, wherein said method is carried out continuously with said mixture being continuously separated to form said resulting mixture which is continuously introduced to said tube and with said particles of said first and second sets being continuously removed from said lower and upper regions of said tube.

10. An apparatus for separating a mixture of a first and a second set of particles, each set having a particle size distribution generally centered about an average particle size section and having generally decreasing amounts of smaller and larger particles to define respective first and second particle size distributions each having smaller particle size sections and larger particle size sections surrounding said average particle size section, with the particle sizes of the smaller particle size sections overlapping one another and with the particle sizes of the larger particle size sections overlapping one another, the first set of particles having a higher terminal velocity when placed in a separation liquid than does the second set of particles, comprising:

means for separating from said mixture either at least a smaller particle size portion and any finer extraneous particles of said first set or at least a larger particle size portion and any larger extraneous particles of said second set in such a manner as to form a resulting mixture with either said first set substantially free of at least said smaller size particle portion and substantially free of finer extraneous material or said second set substantially free of at least said larger size particle portion thereof and of larger extraneous material, the separating means being such that the first and second sets of the resulting mixture are composed of particles having substantially completely non-overlapping terminal velocities in said separation liquid;

a generally vertically extending tube having an entry at an entry height an upper region and a lower region, said separation liquid flowing upwardly through said tube at a velocity less than the terminal velocity of the particles of said first set of particles and greater than the terminal velocity of the particles of said second set of particles;

means for introducing said resulting mixture at said entry height into said tube whereby said first set falls downwardly in said tube to said lower region substantially free of said second set and said second set is carried upwardly in said tube to said upper region substantially free of said first set;

means for removing the particles of said first set from said lower region; and means for removing the particles of said second set from said upper region.

11. An apparatus as set forth in claim 10, further including, within said tube below said entry height;

flow adjustment means for forming an upper area of turbulent flow, a middle area of laminar flow and a lower area of turbulent flow.

12. An apparatus as set forth in claim 11, wherein said flow adjusting means includes:

an upper flange extending inwardly peripherally from said tube to form an upper restricted opening defining said upper area of turbulent flow; and a lower flange located below said upper flange and extending inwardly peripherially from said tube to form a lower restricted opening defining said lower area of turbulent flow.

13. An apparatus as set forth in claim 10, wherein said separating means comprises sieving means.

14. An apparatus as set forth in claim 13, further including:

means for spraying a liquid onto said resulting mixture of said first and second sets in said sieving means.

15. An apparatus as set forth in claim 10, wherein said separating means separates from said mixture the smaller particle size portions and any finer extraneous material and the larger particle size portions and any larger extraneous material of both sets.

16. An apparatus as set forth in claim 10, wherein said separating means removes from the mixture either the smaller particle size portions and any extraneous smaller material or the larger particle size portions and any larger extraneous material of both sets.

17. An apparatus for separating a mixture of a first and a second set of particles, each set having a particle size distribution generally centered about an average particle size section and having generally decreasing amounts of smaller and larger particles to define respective first and second particle size distributions each having smaller particle size sections and larger particle size sections surrounding said average particle size section, with the particle sizes of the smaller particle size sections overlapping one another and with the particle sizes of the larger particle size sections overlapping one another, the first set of particles having a higher terminal velocity when placed in a separation liquid than does the second set of particles, comprising:

means for separating from said mixture either at least a smaller particle size portion and any finer extraneous particles of said first set or at least a larger particle size portion and any larger extraneous particles of said second set in such a manner as to form a resulting mixture with either said first set substantially free of at least said smaller size particle portion and substantially free of finer extraneous material or said second set substantially free of at least said larger size particle portion thereof and of larger extraneous material, the separating means being such that the first and second sets of the resulting mixture are composed of particles having substantially completely non-overlapping terminal velocities in said separation liquid;

a generally vertically extending tube having an entry at an entry height, an upper region and a lower region, said separation liquid flowing upwardly through said tube at a velocity less than the terminal velocity of the particles of said first set of particles and greater than the terminal velocity of the particles of said second set of particles;

means for introducing said resulting mixture at said entry height onto said tube whereby said first set falls downwardly in said tube to said lower region substantially free of said second set and said second set is carried upwardly in said tube to said upper region substantially free of said first set;

means for removing the particles of said first set from said lower region; and means for removing the particles of said second set from said upper region;

further including, within said tube below said entry height;

flow adjustment means for forming an upper area of turbulent flow, a middle area of laminar flow and a lower area of turbulent flow, said flow adjusting means including an upper flange extending inwardly peripherially from said tube to form an upper restricted opening defining said upper area of turbulent flow and a lower flange located below said upper flange and extending inwardly peripherially from said tube to form a lower restricted opening defining said lower area of turbulent flow; and further including:

a middle tubular member within said tube and extending from said upper flange to said lower flange and defining a central flow passage larger than said upper restricted opening and larger than said lower restricted opening, said passage defining said middle area of laminar flow.

18. An apparatus for separating a mixture of a first and a second set of particles, each set having a particle size distribution generally centered about an average particle size section and having generally decreasing amounts of smaller and larger particles to define respective first and second particle size distributions each having smaller particle size sections and larger particle size sections surrounding said average particle size section, with the particle sizes of the smaller particle size sections overlapping one another and with the particle sizes of the larger particle size sections overlapping one another, the first set of particles having a higher terminal velocity when placed in a separation liquid than does the second set of particles, comprising:

means for separating from said mixture either at least a smaller particle size portion and any finer extraneous particles of said first set or at least a larger particle size portion and any larger extraneous particles of said second set in such a manner as to form a resulting mixture with either said first set substantially free of at least said smaller size particle portion and substantially free of finer extraneous material or said second set substantially free of at least said larger size particle portion thereof and of larger extraneous material, the separating means being such that the first and second sets of the resulting mixture are composed of particles having substantially completely non-overlapping terminal velocities in said separation liquid;

a generally vertically extending tube having an entry at an entry height an upper region and a lower region, said separation liquid flowing upwardly through said tube at a velocity less than the terminal velocity of the particles of said first set of particles and greater than the terminal velocity of the particles of said second set of particles;

means for introducing said resulting mixture at said entry height into said tube whereby said first set falls downwardly in said tube to said lower region substantially free of said second set and said second set is carried upwardly in said tube to said upper region substantially free of said first set;

means for removing the particles of said first set from said lower region; and means for removing the particles of said second set from said upper region; and wherein said introducing means comprises a concentric entry tube generally coaxial with said tube, said concentric entry tube delivering said resulting mixture axially downwardly into said tube.

19. An apparatus as set forth in claim 18, further including, within said tube below said entry height;

flow adjustment means for forming an upper area of turbulent flow, a middle area of laminar flow and a lower area of turbulent flow.

20. An apparatus as set forth in claim 19, wherein said flow adjusting means includes:

an upper flange extending inwardly peripherially from said tube to form an upper restricted opening defining said upper area of turbulent flow; and a lower flange located below said upper flange and extending inwardly peripherially from said tube to form a lower restricted opening defining said lower area of turbulent flow.

21. An apparatus as set forth in claim 20, further including:

a middle tubular member within said tube and extending from said upper flange to said lower flange and defining a central flow passage larger than said upper restricted opening and larger than said lower restricted opening, said passage defining said middle area of laminar flow.

22. An apparatus as set forth in claim 21, wherein said separating means comprises sieving means.

23. An apparatus as set forth in claim 19, further including:

means for spraying a liquid onto said first and second sets in said sieving means.

* * * * *